(12) United States Patent
Hamasaki (10) Patent No.: US 8,744,127 B2
(45) Date of Patent: Jun. 3, 2014

(54) IMAGE PROCESSING APPARATUS AND METHOD FOR IMPROVING FRAME RATE WHILE MAINTAINING NATURAL MOVEMENT OF OBJECT ON IMAGES

(75) Inventor: Hiroki Hamasaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 72 days.

(21) Appl. No.: 13/478,391

(22) Filed: May 23, 2012

(65) Prior Publication Data

US 2012/0308080 A1 Dec. 6, 2012

(30) Foreign Application Priority Data

Jun. 1, 2011 (JP) ................................ 2011-123371

(51) Int. Cl.
*G06K 9/00* (2006.01)
(52) U.S. Cl.
USPC ........................................................ 382/103
(58) Field of Classification Search
None
See application file for complete search history.

(56) References Cited

U.S. PATENT DOCUMENTS

| | | | |
|---|---|---|---|
| 6,401,006 B1* | 6/2002 | Mizuno et al. | 700/189 |
| 2006/0018382 A1* | 1/2006 | Shi et al. | 375/240.16 |
| 2007/0196007 A1* | 8/2007 | Chen et al. | 382/131 |
| 2010/0094435 A1* | 4/2010 | Sun et al. | 700/72 |
| 2010/0271484 A1* | 10/2010 | Fishwick et al. | 348/169 |
| 2010/0284627 A1* | 11/2010 | Lin et al. | 382/275 |
| 2012/0308080 A1* | 12/2012 | Hamasaki | 382/103 |

FOREIGN PATENT DOCUMENTS

JP 2007-288681 A 11/2007

* cited by examiner

*Primary Examiner* — Tahmina Ansari
(74) *Attorney, Agent, or Firm* — Sony Corporation of America (57) ABSTRACT

An image processing apparatus includes a motion vector detector configured to detect, based on a first image and a second image different from the first image among a plurality of images, motion vectors representing a movement of an object on the second image with respect to an object on the first image; a first calculation unit configured to calculate an acceleration of the object on the image based on the motion vectors; a second calculation unit configured to calculate an object position representing a position of an object on an interpolation image interpolated between the images adjacent in a time direction among the images based on the acceleration, and an interpolation processing unit configured to interpolate the interpolation image on which the object is drawn at the object position.

11 Claims, 11 Drawing Sheets

IMAGE PROCESSING APPARATUS AND METHOD FOR IMPROVING FRAME RATE WHILE MAINTAINING NATURAL MOVEMENT OF OBJECT ON IMAGES

CROSS-REFERENCE TO RELATED APPLICATION

The present application claims priority from Japanese Patent Application No. JP 2011-123371 filed in the Japanese Patent Office on Jun. 1, 2011, the entire content of which is incorporated herein by reference.

BACKGROUND

The present disclosure relates to an image processing apparatus, an image processing method, and a program, and more particularly to an image processing apparatus, an image processing method, and a program that are capable of improving a frame rate (or field rate) while maintaining a natural movement of an object on an image, for example.

There is, for example, frame interpolation processing for interpolating a new frame into a moving image including a plurality of frames (or fields) and improving a frame rate (see Japanese Patent Application Laid-Open No. 2007-288681, for example).

In the frame interpolation processing, for example, a motion vector representing a movement of an object on a second frame with respect to an object on a first frame is detected among frames constituting the moving image. It should be noted that the second frame represents a next frame following the first frame.

Figure 1:
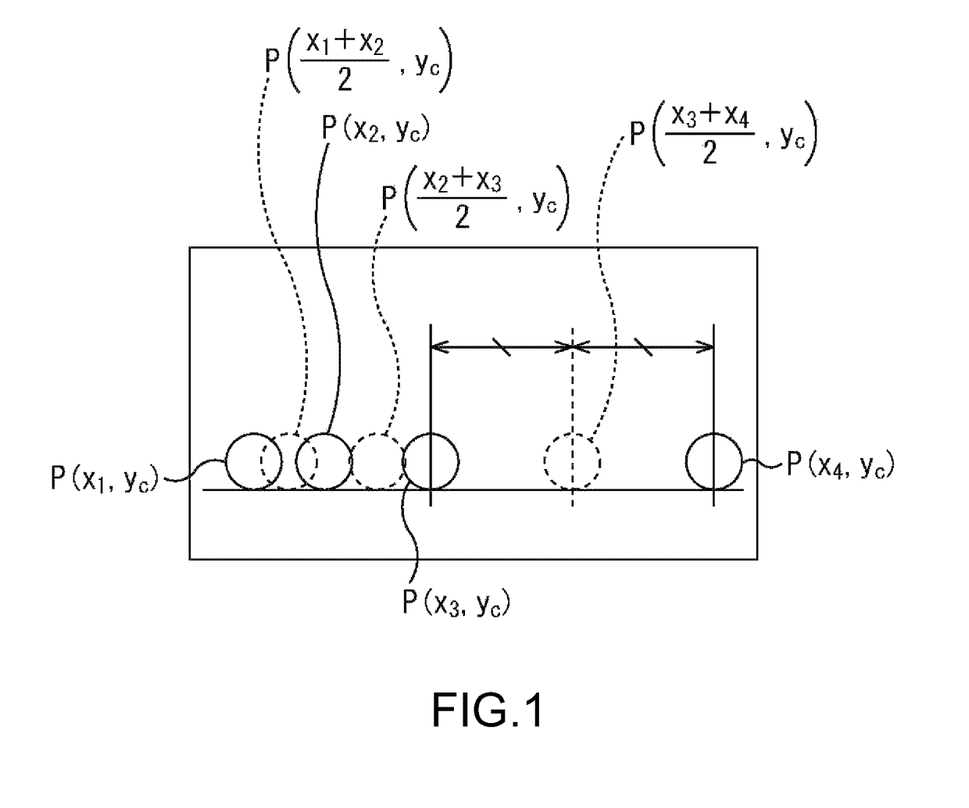
FIG. 1 is a diagram for explaining frame interpolation processing in the past.

Moreover, in the frame interpolation processing, as shown in FIG. 1, an intermediate position $P((x_1+x_2)/2, y_c)$ between a position $P(x_1, y_c)$ of the object on the first frame and a position $P(x_2, y_c)$ of the object on the second frame is calculated based on the detected motion vector.

Then, a frame displaying an object at the calculated intermediate position $P((x_1+x_2)/2, y_c)$ is interpolated between the first frame and the second frame as an interpolation frame, thereby improving the frame rate.

It should be noted that the interpolation frame displaying the object at an intermediate position $P((x_2+x_3)/2, y_c)$ is interpolated between the second frame and a third frame representing the next frame following the second frame. In this case, the intermediate position $P((x_2+x_3)/2, y_c)$ represents the intermediate position between the position $P(x_2, y_c)$ of the object on the second frame and a position $P(x_3, y_c)$ of the object on the third frame.

Furthermore, the interpolation frame displaying the object at an intermediate position $P((x_3+x_4)/2, y_c)$ is interpolated between the third frame and a fourth frame representing the next frame following the third frame. In this case, the intermediate position $P((x_3+x_4)/2, y_c)$ represents the intermediate position between the position $P(x_3, y_c)$ of the object on the third frame and a position $P(x_4, y_c)$ of the object on the fourth frame.

SUMMARY

In the frame interpolation processing described above, for example, the position of the object on the interpolation frame interpolated between the first frame and the second frame is simply set at the intermediate position $P((x_1+x_2)/2, y_c)$ regardless of the movement of the object.

Therefore, for example, when the object is traveling in a uniform accelerated motion at an acceleration $a(\neq 0)$, the position in the law of nature where the object should be actually present and the position of the object on the interpolation frame calculated in the frame interpolation processing are different.

Accordingly, in the moving image obtained by the frame interpolation processing, the movement of the object on the image becomes considerably unnatural.

The present disclosure has been conceived in view of the above-described circumstances so as to improve the frame rate while maintaining a natural movement of the object on the image.

According to an embodiment of the present disclosure, there is provided an image processing apparatus including: a motion vector detector configured to detect, based on a first image and a second image different from the first image among a plurality of images, motion vectors representing a movement of an object on the second image with respect to an object on the first image; a first calculation unit configured to calculate an acceleration of the object on the image based on the motion vectors; a second calculation unit configured to calculate an object position representing a position of an object on an interpolation image interpolated between the images adjacent in a time direction among the plurality of images based on the acceleration; and an interpolation processing unit configured to interpolate the interpolation image on which the object is drawn at the object position.

The second calculation unit may calculate the object position based on an interpolation curve corresponding to the acceleration among a plurality of interpolation curves each representing the object position on the interpolation image.

The first calculation unit may also calculate an initial velocity of the object on the image based on the motion vectors, and the second calculation unit may calculate the object position on the interpolation image based on the acceleration and the initial velocity.

The first calculation unit may calculate the acceleration of at least one of a horizontal direction and a vertical direction based on the motion vectors.

According to an embodiment of the present disclosure, there is provided an image processing method of an image processing apparatus that interpolates an interpolation image between images adjacent in a time direction, the method including: by the image processing apparatus, detecting, based on a first image and a second image different from the first image among a plurality of images, motion vectors representing a movement of an object on the second image with respect to an object on the first image; calculating an acceleration of the object on the image based on the motion vectors; calculating an object position representing a position of the object on the interpolation image interpolated between the images adjacent in a time direction among the plurality of images based on the acceleration; and interpolating the interpolation image on which the object is drawn at the object position.

According to an embodiment of the present disclosure, there is provided a program that causes a computer to function as: a motion vector detector configured to detect, based on a first image and a second image different from the first image among a plurality of images, motion vectors representing a movement of an object on the second image with respect to an object on the first image; a first calculation unit configured to calculate an acceleration of the object on the image based on the motion vectors; a second calculation unit configured to calculate an object position representing a position of an object on an interpolation image interpolated between the images adjacent in a time direction among the plurality of images based on the acceleration; and an interpolation processing unit configured to interpolate the interpolation image on which the object is drawn at the object position.

According to the embodiment of the present disclosure, the motion vectors representing the movement of the object on the second image with respect to the object on the first image are detected based on the first image and the second image different from the first image among the images, the acceleration of the object on the image is calculated based on the motion vectors, the object position representing the position of the object on the interpolation image interpolated between the images adjacent in the time direction among the images is calculated based on the acceleration, and the interpolation image on which the object is drawn at the object position is interpolated.

According to the embodiments of the present disclosure, it is possible to improve the frame rate while maintaining the natural movement of the object on the image.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment for carrying out the present disclosure (hereinafter referred to as the present embodiment) will be described. Herein, the explanation will proceed in the following order.

1. Present embodiment (example of calculating a position of an object on an interpolation frame interpolated in accordance with acceleration of an object on an image)

2. Modified examples

1. Present Embodiment

Configuration Example of Image Processing Apparatus 21

Figure 2:
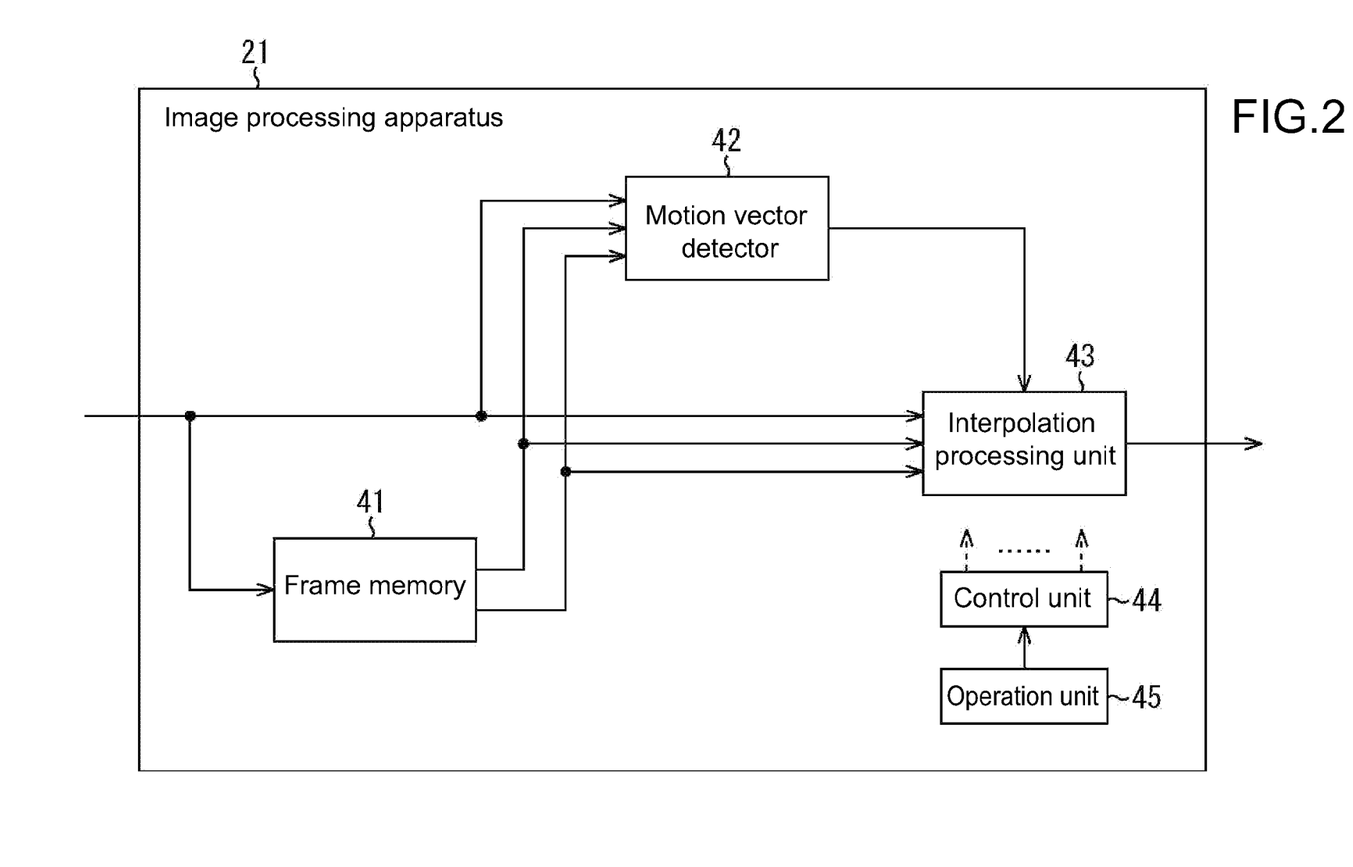
FIG. 2 is a block diagram showing a configuration example of an image processing apparatus according to an embodiment of the present disclosure.

FIG. 2 shows a configuration example of an image processing apparatus 21 according to an embodiment of the present disclosure.

Herein, the image processing apparatus 21 can improve a frame rate while maintaining a natural movement of the object on the image, for example.

The image processing apparatus 21 includes a frame memory 41, a motion vector detector 42, an interpolation processing unit 43, a control unit 44 and an operation unit 45.

The image processing apparatus 21 receives, from outside, a moving image including a plurality of frames (or fields). That is, the frame memory 41, the motion vector detector 42, and the interpolation processing unit 43 suitably receive a frame n which is inputted n-th from outside.

The frame memory 41 delays the frame n from outside by one frame and supplies it to the motion vector detector 42 and the interpolation processing unit 43. Moreover, the frame memory 41 delays the frame n from outside by two frames and supplies it to the motion vector detector 42 and the interpolation processing unit 43.

That is, for example, when the motion vector detector 42 and the interpolation processing unit 43 receive the frame n from outside, the frame memory 41 supplies a frame n−1 and a frame n−2 to the motion vector detector 42 and the interpolation processing unit 43.

The motion vector detector 42 detects a motion vector MV(n−2,n−1) representing the movement of the object on the frame n−1 with respect to the object of the frame n−2 by block matching or the like based on the frame n−1 and the frame n−2 from the frame memory 41, for example.

In addition, for example, the motion vector detector 42 detects a motion vector MV(n−1,n) representing the movement of the object on the frame n with respect to the object of the frame n−1 by the block matching or the like based on the frame n from outside and the frame n−1 from the frame memory 41.

Then, the motion vector detector 42 supplies the detected motion vector MV(n−2,n−1) and motion vector MV(n−1,n) to the interpolation processing unit 43.

The interpolation processing unit 43 calculates an initial velocity $v_0$ and an acceleration a of the object on the frame n based on the motion vector MV(n−2,n−1) and the motion vector MV(n−1,n) from the motion vector detector 42.

Herein, when the horizontal direction is an X direction and the vertical direction is a Y direction in the frame n, the initial velocity $v_0$ is decomposed into $v_{0x}$ as an X component and $v_{0y}$ as a Y component. Moreover, the acceleration a is decomposed into $a_x$ as the X component and $a_y$ as the Y component.

The interpolation processing unit 43 applies the calculated initial velocity $v_{0x}$ and acceleration $a_x$ to the following expression (1) and calculates a displacement dx of an object on an interpolation frame f(n−1,n) interpolated between the frame n−1 and the frame n and displayed at a time t.

$$dx = v_{0x} \times t + a_x/2 \times t^2 \quad (1)$$

Herein, the displacement dx represents a displacement (variation amount) of x at a position (x,y) of the object on the interpolation frame f(n−1,n) with respect to a reference position $x_0$ when $x_0$ at a position $(x_0,y_0)$ of the object on the frame at a time t=0 is the reference position $x_0$, for example.

The interpolation processing unit 43 calculates $x(=x_0+dx)$ at the position (x,y) of the object on the interpolation frame f(n−1,n) based on the displacement dx calculated by using the expression (1) and the reference position $x_0$.

Likewise, the interpolation processing unit 43 applies the calculated initial velocity $v_{0y}$ and acceleration $a_y$ to the following expression (2) and calculates a displacement dy of the object on the interpolation frame f(n−1,n) interpolated between the frame n−1 and the frame n and displayed at the time t.

$$dy = v_{0y} \times t + a_y/2 \times t^2 \quad (2)$$

Herein, the displacement dy represents a displacement (variation amount) of y at the position (x,y) of the object on the interpolation frame f(n−1,n) with respect to a reference position $y_0$ when $y_0$ at a position $(x_0,y_0)$ of the object on the frame at the time t=0 is the reference position $y_0$, for example.

The interpolation processing unit 43 calculates $y(=y_0+dy)$ at the position (x,y) of the object on the interpolation frame f(n−1,n) based on the displacement dy calculated by using the expression (2) and the reference position $y_0$.

Moreover, the interpolation processing unit 43 generates the interpolation frame f(n−1,n) on which the object is displayed (drawn) at the position (x,y) calculated by using the expressions (1) and (2) based on the frame n from outside and the frame n−1 from the frame memory 41. Then, the interpolation processing unit 43 interpolates the generated interpolation frame f(n−1,n) between the frame n−1 and the frame n.

As with the case where the interpolation frame f(n−1,n) is generated and interpolated, the interpolation processing unit 43 generates an interpolation frame f(n−2,n−1) based on the frame n−2 and the frame n−1 from the frame memory 41 and interpolates it between the frame n−2 and the frame n−1.

The interpolation processing unit 43 outputs the moving image obtained after the interpolation frame is interpolated.

The control unit 44 controls the frame memory 41, the motion vector detector 42 and the interpolation processing unit 43 in response to an operation signal from the operation unit 45, for example.

The operation unit 45 includes, for example, operation buttons and supplies a corresponding operation signal to the control unit 44 in accordance with an operation by a user.

[Calculation Method of Initial Velocity $V_0$ and Acceleration a]

Next, referring to FIGS. 3A to 3D, an example of a calculation method for calculating the initial velocity $v_0$ and the acceleration a will be described.

Figure 3A:
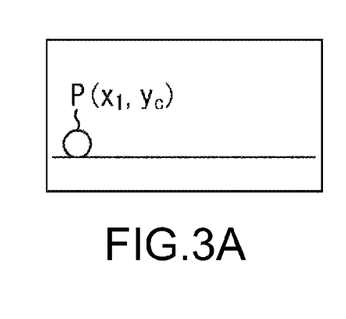
FIGS. 3A to 3D are diagrams for explaining an example of a calculation method for calculating an initial velocity and acceleration.

FIG. 3A shows the frame n−2 on which the object is displayed at the position $P(x_1,y_c)$. Herein, the position $P(x_1,y_c)$ is represented by XY axes showing the lower-left position in the frame n−2 as an origin(0,0), the horizontal direction as an X-axis, and the vertical direction as a Y-axis. This also applies similarly to FIGS. 3B to 3D, FIGS. 4A and 4B, and also FIG. 6 to FIGS. 8A and 8B discussed below.

Moreover, the time t at which the frame n−2 shown in FIG. 3A is displayed is set as 0 in the expressions (1) and (2). This means that the position $P(x_1,y_c)$ of the object on the frame n−2 is set as the reference position, that is, a reference position $x_0$ of the X-axis direction=$x_1$ and a reference position $y_0$ of the Y-axis direction=$y_c$.

Figure 3B:
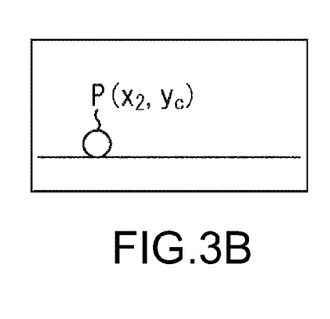
Figure 3C:
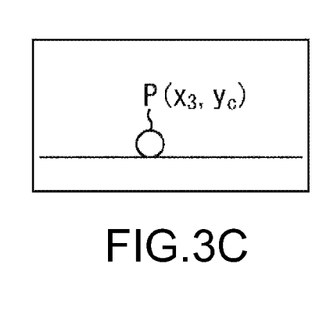
Figure 3D:
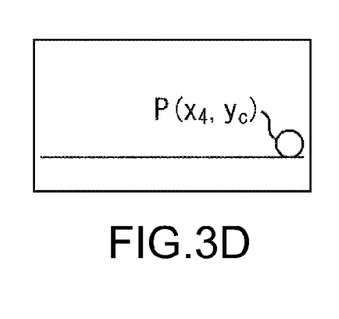

FIG. 3B shows the frame n−1 on which the object is displayed at a position $P(x_2,y_c)$. FIG. 3C shows the frame n on which the object is displayed at a position $P(x_3,y_c)$. FIG. 3D shows a frame n+1 on which the object is displayed at a position $P(x_4,y_c)$.

As shown in FIGS. 3A and 3B, the motion vector detector 42 detects the motion vector MV(n−2,n−1) which sets the position $P(x_1,y_c)$ as a starting point and the position $P(x_2,y_c)$ as an ending point based on the frame n−2 and the frame n−1 from the frame memory 41 and supplies it to the interpolation processing unit 43.

Moreover, as shown in FIGS. 3B and 3C, the motion vector detector 42 detects the motion vector MV(n−1,n) which sets the position $P(x_2,y_c)$ as the starting point and the position $P(x_3,y_c)$ as the ending point based on the frame n−1 from the frame memory 41 and the frame n from outside and supplies it to the interpolation processing unit 43.

The interpolation processing unit 43 calculates, for example, a distance $D_x(n-2,n-1)(=|x_1-x_2|)$ in the X-axis direction and a distance $D_y(n-2,n-1)(=|y_c-y_c|)$ in the Y-axis direction as a distance from the position $P(x_1,y_c)$ of the starting point to the position $P(x_2,y_c)$ of the ending point based on the motion vector MV(n−2,n−1) from the motion vector detector 42.

Then, the interpolation processing unit 43 divides the calculated distance $D_x(n-2,n-1)$ by a predetermined time T and calculates a velocity $v_{0x}(=D_x(n-2,n-1)/T)$ in the X-axis direction in the object on the frame n−1 as the X component of the initial velocity $v_0$.

Herein, the time T represents a time taken from a display of a frame (for example, frame n−2) to a display of the next frame (for example, frame n−1) in a moving image inputted from outside.

Moreover, the interpolation processing unit 43 divides the calculated distance $D_y(n-2,n-1)$ by the predetermined time T and calculates a velocity $v_{0y}(=D_y(n-2,n-1)/T)$ in the Y-axis direction in the object on the frame n−1 as the Y component of the initial velocity $v_0$.

Furthermore, the interpolation processing unit 43 calculates, for example, a distance $D_x(n-1,n)(=|x_2-x_3|)$ in the X-axis direction and a distance $D_y(n-1,n)(=|y_0-y_c|)$ in the Y-axis direction as the distance from the position $P(x_2,y_c)$ of the starting point to the position $P(x_3,y_c)$ of the ending point based on the motion vector MV(n−1,n) from the motion vector detector 42.

Likewise, the interpolation processing unit 43 calculates a velocity $v_{1x}(=D_x(n-1,n)/T)$ in the X-axis direction and a velocity $v_{1y}(=D_y(n-1,n)/T)$ in the Y-axis direction as a velocity $v_1$ in the object on the frame n.

The interpolation processing unit 43 calculates an acceleration $a(=(v_1-v_0)/T)$ of the object based on the calculated velocity $v_0$ and velocity $v_1$ and the predetermined time T. That is, for example, the interpolation processing unit 43 calculates an acceleration $a_x(=(v_{1x}-v_{0x})/T)$ in the X-axis direction and an acceleration $a_y(=(v_{1y}-v_{0y})/T)$ in the Y-axis direction as the acceleration a. Here, for example, when the position yc of the object in the Y-axis direction is constant as shown in FIG. 3, the position in the Y-axis direction in the object on the interpolation frame becomes the position $y_c$. Therefore, in this case, since the position in the Y-axis direction is already determined, the interpolation processing unit 43 may calculate only the acceleration $a_x(=(v_{1x}-v_{0x})/T)$ in the X-axis direction and determine the position of the object in the X-axis direction from the calculated acceleration $a_x$, for example.

Herein, as described above, the interpolation processing unit 43 calculates the initial velocity $v_0$ and the acceleration a based on the motion vector MV(n−1,n) and the motion vector MV(n−2,n−1) from the motion vector detector 42.

Alternatively, for example, the motion vector detector 42 may use the frame n+1 as shown in FIG. 3D to detect a motion vector MV(n,n+1), and the interpolation processing unit 43 may also use the motion vector MV(n,n+1) to improve calculation accuracy of the initial velocity $v_0$ and the acceleration a.

In this case, the frame memory 41 delays and outputs the frame from outside by one frame and two frames and also by three frames.

[Method of Determining Position of Object]

Figure 4A:
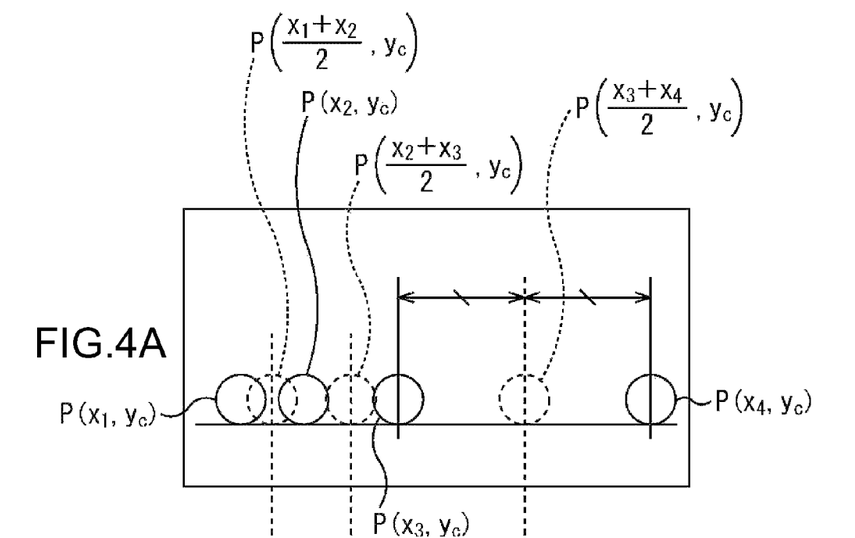
FIGS. 4A and 4B are diagrams showing an example of a determination method for determining a position of an object displayed on an interpolation frame.
Figure 4B:
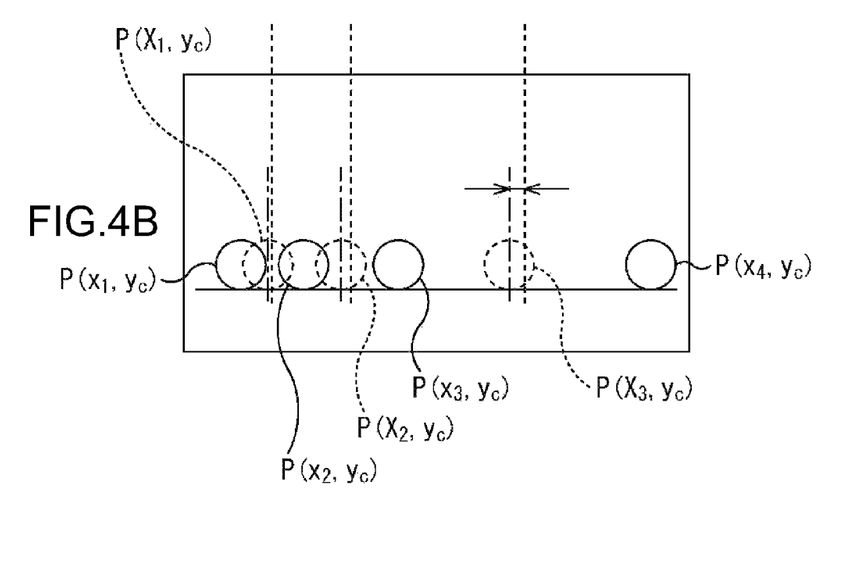

Next, FIGS. 4A and 4B show an example of a determining method for determining the position of the object displayed on the interpolation frame f(n−1,n).

Unlike the example shown in FIG. 4A, for example, the interpolation processing unit 43 does not calculate the intermediate position $P((x_1+x_x)/2, y_c)$ between the position $P(x_1, y_c)$ of the object on the frame n−2 and the position $P(x_2,y_c)$ of the object on the frame n−1 as the position of the object on the interpolation frame f(n−2,n−1).

That is, for example, as shown in FIG. 4B, the interpolation processing unit 43 determines the position corresponding to the acceleration a of the object as the position of the object on the interpolation frame.

Specifically, for example, the interpolation processing unit 43 applies the calculated initial velocity $v_{0x}$ and acceleration $a_x$ to the expression (1) and calculates the displacement dx of the object on the interpolation frame f(n−2,n−1).

The interpolation processing unit 43 calculates a position $X_1(=x_0+dx)$ in the X-axis direction of the object on the interpolation frame f(n−2,n−1) based on the displacement dx calculated by using the expression (1) and the reference position $x_0$.

Moreover, for example, the interpolation processing unit 43 applies the calculated initial velocity $v_{0y}$ and acceleration $a_y$ to the expression (2) and calculates the displacement dy of the object on the interpolation frame f(n−2,n−1).

The interpolation processing unit 43 calculates a position $y_0(=y_0+dy)$ in the Y-axis direction of the object on the interpolation frame f(n−2,n−1) based on the displacement dy calculated by using the expression (2) and the reference position $y_0$.

Then, the interpolation processing unit 43 determines the $P(X_1,y_c)$ including the calculated position $X_1$ in the X-axis direction and position $y_c$ in the Y-axis direction as the position of the object on the interpolation frame f(n−2,n−1).

Likewise, the interpolation processing unit 43 determines the position $P(X_2,y_c)$ of the object on the interpolation frame f(n−1,n) and the position $P(X_3,y_c)$ of the object on the interpolation frame f(n,n+1).

Therefore, in the present embodiment, unlike the case where the position of the object on the frame is simply set as the intermediate position as shown in FIG. 4A, the position of the object is set at a natural position in accordance with the acceleration a of the object as shown in FIG. 4B. That is, the position of the objection on the frame is the position of the object which travels in accordance with the law of nature.

[Description of Operation of Image Processing Apparatus 21]

Figure 5:
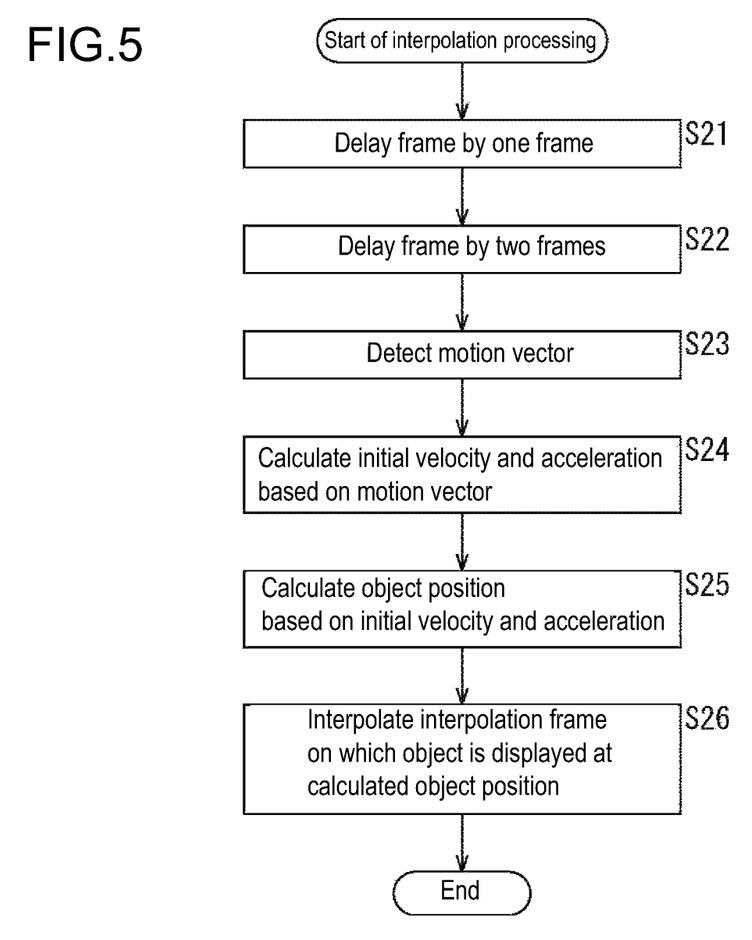
FIG. 5 is a flowchart for explaining interpolation processing performed by the image processing apparatus.

Next, with reference to the flowchart in FIG. 5, the interpolation processing performed by the image processing apparatus 21 will be described.

The interpolation processing is started when the image processing apparatus 21 receives (the frame including) the moving image from outside, for example.

In step S21, the frame memory 41 delays the frame n from outside by one frame and supplies it to the motion vector detector 42 and the interpolation processing unit 43.

In step S22, the frame memory 41 delays the frame n from outside by two frames and supplies it to the motion vector detector 42 and the interpolation processing unit 43.

That is, for example, when the motion vector detector 42 and the interpolation processing unit 43 receive the frame n from outside, the motion vector detector 42 and the interpolation processing unit 43 receive the frame n−2 and the frame n−1 from the frame memory 41 in processing in step S21 and step S22.

In step S23, the motion vector detector 42 detects the motion vector MV(n−2,n−1) representing the movement of the object on the frame n−1 with respect to the object of the frame n−2 by the block matching or the like based on the frame n−1 and the frame n−2 from the frame memory 41.

Moreover, the motion vector detector 42 detects the motion vector MV(n−1,n) representing the movement of the object on the frame n with respect to the object of the frame n−1 by the block matching or the like based on the frame n from outside and the frame n−1 from the frame memory 41.

Then, the motion vector detector 42 supplies the detected motion vector MV(n−2,n−1) and motion vector MV(n−1,n) to the interpolation processing unit 43.

In step S24, the interpolation processing unit 43 calculates the initial velocity $v_0$ and the acceleration a of the object on the frame n based on the motion vector MV(n−2,n−1) and the motion vector MV(n−1,n) from the motion vector detector 42.

Herein, the initial velocity $v_0$ is decomposed into $v_{0x}$ which is the X component and $v_{0y}$ which is the Y component. Moreover, the acceleration a is decomposed into $a_x$ which is the X component and $a_y$ which is the Y component.

In step S25, the interpolation processing unit 43 applies the calculated initial velocity $v_{0x}$ and acceleration $a_x$ to the expression (1) and calculates the displacement dx of the object on the interpolation frame f(n−1,n).

Then, the interpolation processing unit 43 calculates $x(=x_0+dx)$ at the position (x,y) of the object on the interpolation frame f(n−1,n) based on the displacement dx calculated by using the expression (1) and reference position $x_0$.

Likewise, the interpolation processing unit 43 applies the calculated initial velocity $v_{0y}$ and acceleration $a_y$ to the expression (2) and calculates the displacement dy of the object on the interpolation frame f(n−1,n).

The interpolation processing unit 43 calculates $y(=y_0+dy)$ at the position (x,y) of the object on the interpolation frame f(n−1,n) based on the displacement dy calculated by using the expression (2) and the reference position $y_0$.

In step S26, the interpolation processing unit 43 generates the interpolation frame f(n−1,n) on which the object is displayed (drawn) at the position (x,y) calculated by using the expressions (1) and (2) based on the frame n from outside and the frame n−1 from the frame memory 41. Then, the interpolation processing unit 43 interpolates the generated interpolation frame f(n−1,n) between the frame n−1 and the frame n.

Herein, as with the case where the interpolation frame f(n−1,n) is generated and interpolated in step S25 and step S26, the interpolation processing unit 43 generates the interpolation frame f(n−2,n−1) based on the frame n−2 and the frame n−1 from the frame memory 41 and interpolates it between the frame n−2 and the frame n−1.

The interpolation processing unit 43 outputs the moving image obtained after the interpolation frame is interpolated. Then, after all the frames constituting the moving image inputted from outside are processed in the interpolation processing unit 43, the interpolation processing is completed.

As described above, in the interpolation processing, the position corresponding to the acceleration a of the object is calculated, and the interpolation frame displaying the object at that position is generated.

Therefore, in the interpolation processing, it is possible to improve the frame rate while maintaining a natural movement of the object.

Next, referring to FIG. 6 to FIGS. 8A and 8B, the case where the position of the object on the interpolation frame is determined from the object which is changed at any position in the X-axis direction and the Y-axis direction will be described.

Figure 6:
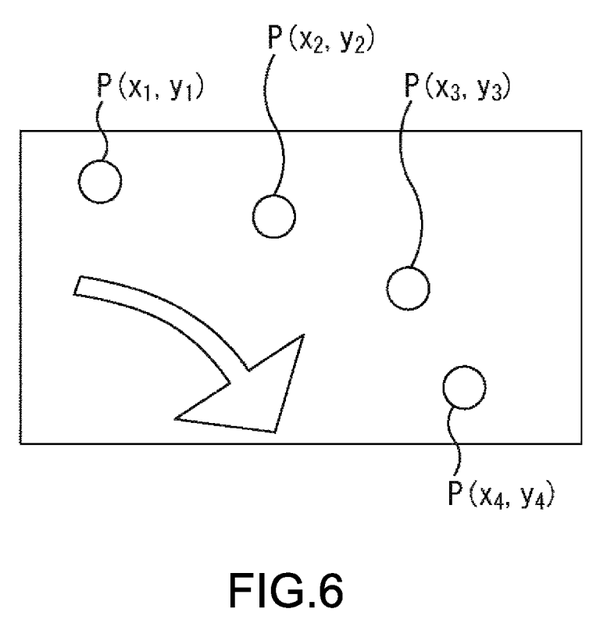
FIG. 6 is a block diagram showing an example of an object which is changed at any position in an X-axis direction and a Y-axis direction.

FIG. 6 is a block diagram showing an example of the object which is changed at any position in the X-axis direction and the Y-axis direction. In FIG. 6, a position $P(x_1,y_1)$ shows a position of the object on the frame n−2, a position $P(x_2,y_2)$ shows a position of the object on the frame n−1, a position $P(x_3,y_3)$ shows a position of the object on the frame n, and a position $P(x_4,y_4)$ shows a position of the object on the frame n+1.

Next, referring to FIGS. 7A, 7B and FIGS. 8A, 8B, the difference between a case where the position of the object on the interpolation frame is simply determined at the intermediate position and a case where the position of the object on the interpolation frame is determined in accordance with the acceleration a of the object will be described.

Figure 7A:
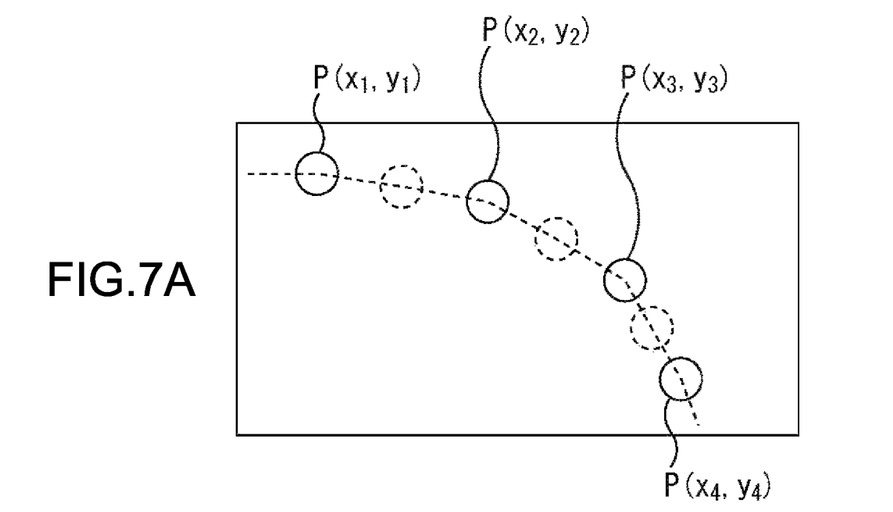
FIGS. 7A and 7B are diagrams showing an example of a case where the position of the object is determined at an intermediate position regardless of the movement of the object.
Figure 7B:
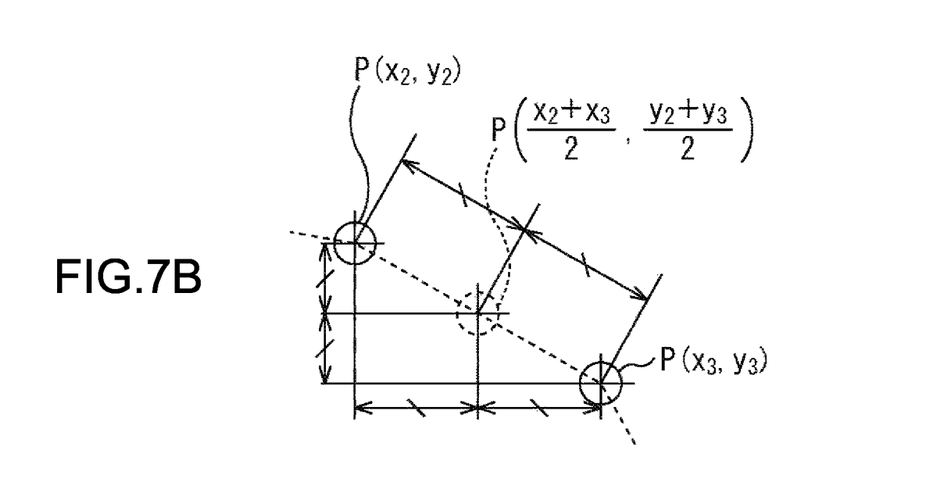

FIGS. 7A and 7B show an example of a case where the position of the object is determined at the intermediate position as in the past regardless of the movement of the object.

FIG. 7A shows an example of a case where the intermediate position (each dashed-line circle in FIG. 7A) calculated from the positions $P(x_1,y_1)$, $P(x_2,y_2)$, $P(x_3,y_3)$ and $P(x_4,y_4)$ of the object on each frame constituting the moving image is determined at the position of the object on the interpolation frame.

FIG. 7B shows an example of an intermediate position $P((x_2+x_3)/2, (y_2+y_3)/2)$ between the position $P(x_2,y_2)$ and the position $P(x_3,y_3)$ of the object on each frame constituting the moving image.

Figure 8A:
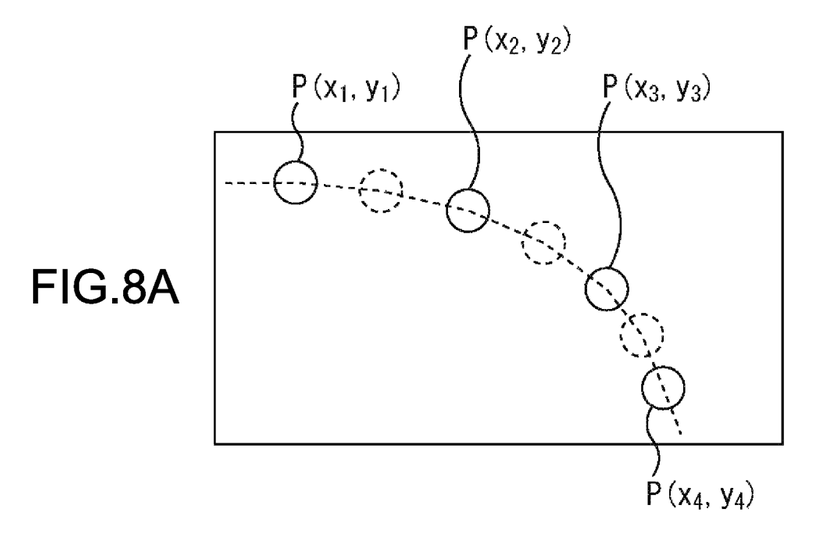
FIGS. 8A and 8B are diagrams showing an example of a case where the position of the object is determined in accordance with the movement of the object.
Figure 8B:
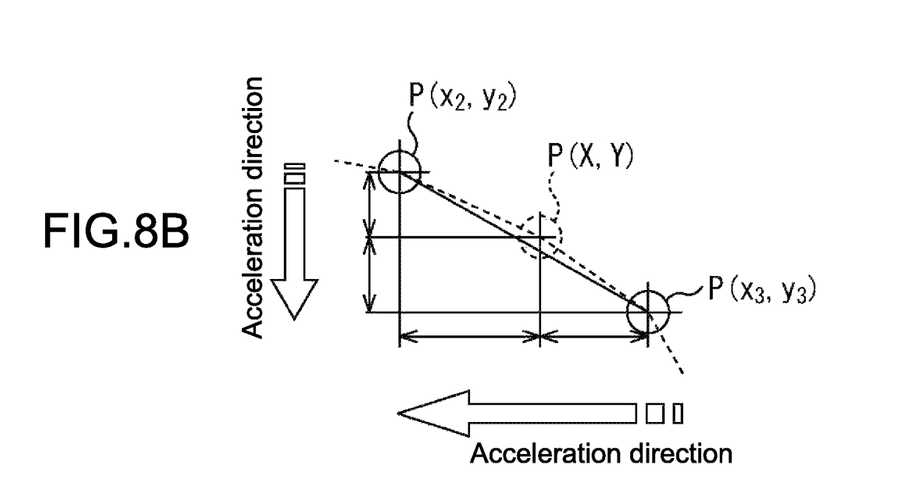

FIGS. 8A and 8B show an example of a case where the position of the object is determined in accordance with the acceleration a of the object.

FIG. 8A shows an example of a case where the position calculated by using the expressions (1), (2) and the like (each dashed-line circle in FIG. 8A) is determined at the position of the object on the interpolation frame.

FIG. 8B shows an example of a position P(X,Y) calculated by using the expressions (1), (2) and the like as the position between the position $P(x_2,y_2)$ and the position $P(x_3,y_3)$ of the object on each frame constituting the moving image. The position P(X,Y) is a position corresponding to the movement of the object which draws a parabola in accordance with the law of nature.

As shown in FIG. 7A, when the position of the object is determined at the intermediate position regardless of the movement of the object, a locus of the object is not interpolated accurately and is unnatural.

On the contrary, as shown in FIG. 8A, when the position of the object is determined in accordance with the movement of the object, the locus of the object is interpolated in accordance with the acceleration a of the object so that the locus of the object becomes natural.

2. Modified Examples

In the present embodiment, the motion vector detector 42 uses two frames different by one frame to detect the motion vector. Alternatively, for example, the motion vector detector 42 may use two frames different by a plurality of frames to detect the motion vector.

Specifically, for example, the motion vector detector 42 may use the frame n−2 and the frame n to calculate the motion vector MV(n−2,n) and use the frame n and the frame n+2 to calculate the motion vector MV(n,n+2).

In this case, the interpolation processing unit 43 uses the motion vector MV(n−2,n) and the motion vector MV(n,n+2) to calculate the initial velocity $v_0$ and the acceleration a and determines the position of the object on the interpolation frame based on the calculated initial velocity $v_0$ and acceleration a.

In the present embodiment, the interpolation processing unit 43 determines the position of the object on the interpolation frame by applying the calculated initial velocity $v_0$ and acceleration a to the expressions (1) and (2). Alternatively, for example, the interpolation processing unit 43 may determine the position of the object on the interpolation frame by using an interpolation curve corresponding to the calculated acceleration a among a plurality of predetermined interpolation curves.

Herein, the plurality of interpolation curves are stored in advance in a built-in memory (not shown) and the like of the interpolation processing unit 43 for each of different accelerations, for example.

[Example of Interpolation Curve]

Next, referring to FIG. 9 to FIG. 11, an example of the interpolation curve used when the position of the object on the interpolation frame is determined will be described.

Figure 9:
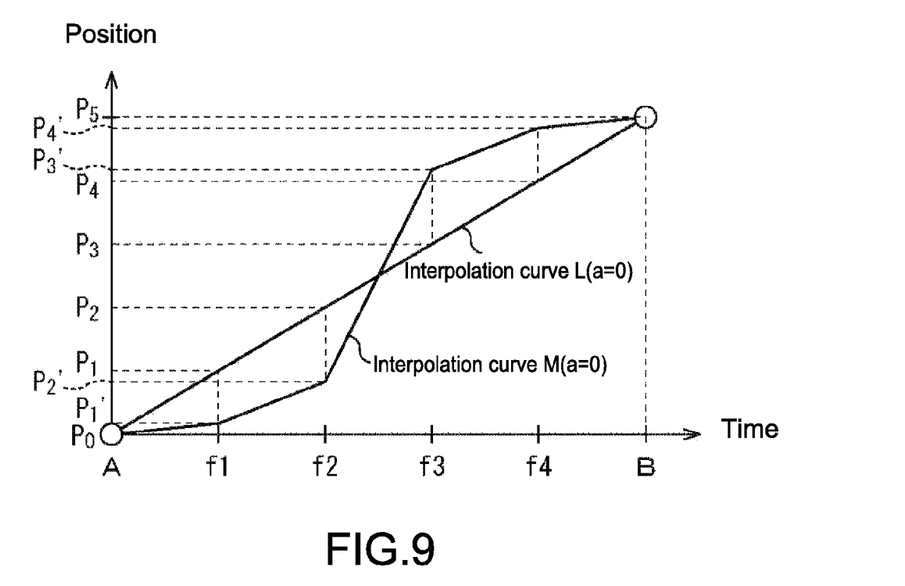
FIG. 9 is a diagram showing an example of an interpolation curve representing the position of the object which travels in a uniform accelerated motion in the X-axis direction at an acceleration a=0.

FIG. 9 shows an example of the interpolation curve representing the position of the object which travels in a uniform accelerated motion (linear uniform motion) in the X-axis direction at the acceleration a=0.

Herein, in FIG. 9, the horizontal axis represents a time when the frame is displayed and the vertical axis represents a position in the X-axis direction of the object on the frame.

As shown in FIG. 9, an interpolation curve L(a=0) represents positions P1, P2, P3 and P4 of the objects on interpolation frames f1, f2, f3 and f4 interpolated between a frame A and a frame B.

The positions P1, P2, P3 and P4 are determined relatively based on a position P0 of the object on the frame A and a position P5 of the object on the frame B, and shows the position of the object which travels in the uniform accelerated motion in the X-axis direction at the acceleration a=0.

The interpolation curve L(a=0) is used when the interpolation frames f1 to f4 are interpolated to make the movement of the object smoother in a period from the frame A to the frame B.

As shown in FIG. 9, an interpolation curve M(a=0) represents positions P1', P2', P3' and P4' of the objects on the interpolation frames f1, f2, f3 and f4 interpolated between the frame A and the frame B.

The positions P1', P2', P3' and P4' are determined relatively based on the position P0 of the object on the frame A and the position P5 of the object on the frame B, and shows the position of the object which travels in the uniform accelerated motion in the X-axis direction at the acceleration a=0.

The interpolation curve M(a=0) is used when the interpolation frames f1 to f4 are interpolated so as to generate a judder in the movement of the object in the period from the frame A to the frame B. Herein, for example, the interpolation curve M(a=0) is used when the interpolation frames are interpolated so as to maintain the judder generated on the original frames A and B.

Figure 10:
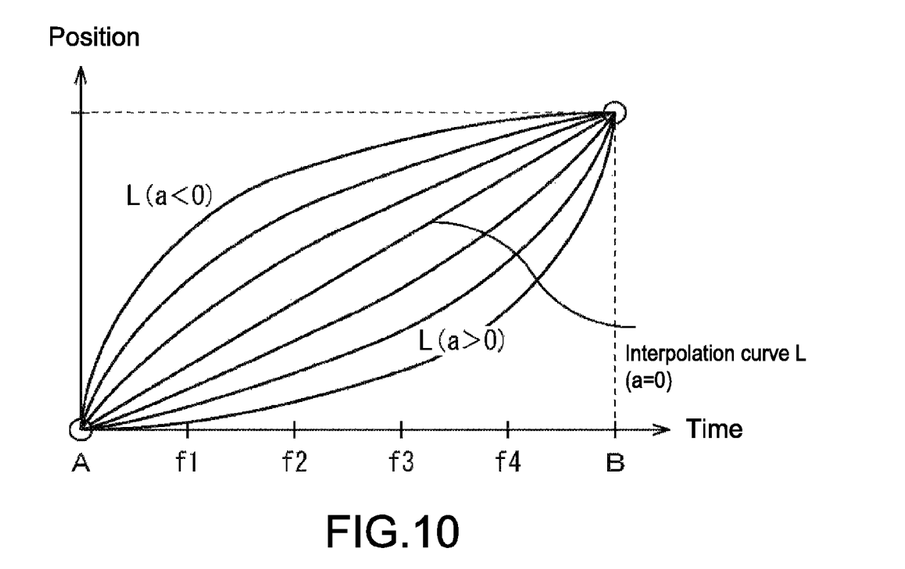
FIG. 10 is a diagram showing an example of an interpolation curve L(a≠0) representing the position of the object which travels in the uniform accelerated motion in the X-axis direction at an acceleration a≠0.

Next, FIG. 10 shows an example of an interpolation curve L(a≠0) representing the position of the object which travels in the uniform accelerated motion in the X-axis direction at the acceleration a≠0.

For example, the interpolation processing unit 43 stores a plurality of interpolation curves as shown in FIG. 10 in the built-in memory (not shown) and the like in association with different accelerations a.

Herein, in FIG. 10, the interpolation curve L drawn more on the right-hand side is correlated with a larger acceleration a, and the interpolation curve L drawn more on the left-hand side is correlated with a smaller acceleration a. Moreover, in FIG. 10, the interpolation curve L shows the position (x,y) of the object corresponding to the acceleration a for each of the different accelerations a.

Therefore, for example, the interpolation processing unit 43 determines the position of the object on the interpolation frames f1 to f4 by using an interpolation curve L(a>0) in the right direction in the figure as the calculated acceleration a becomes larger.

Moreover, for example, the interpolation processing unit 43 determines the position (x,y) of the object on the interpolation frames f1 to f4 by using an interpolation curve L(a<0) in the left direction in the figure as the acceleration a becomes smaller.

Herein, in FIG. 10, the interpolation curve L shows the position (x,y) of the object corresponding to the acceleration a for each of the different accelerations a. Alternatively, for example, it is also possible to prepare a first interpolation curve L representing the position x of the object corresponding to the acceleration $a_x$ for each acceleration $a_x$ and a second interpolation curve L representing the position y of the object corresponding to the acceleration $a_y$ for each acceleration $a_y$.

In this case, the interpolation processing unit 43 uses the acceleration $a_x$ in the X-axis direction to determine the position x of the object by the first interpolation curve L and uses the acceleration $a_y$ in the Y-axis direction to determine the position y of the object by the second interpolation curve L. This also applies similarly to FIG. 11 which will be described below.

Figure 11:
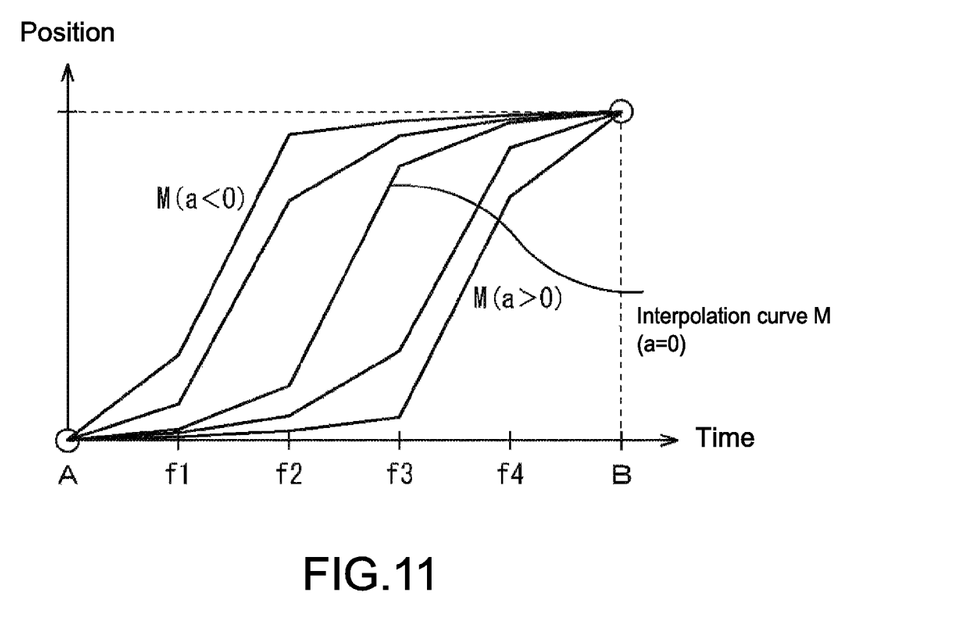
FIG. 11 is a diagram showing an example of an interpolation curve M(a≠0) representing the position of the object which travels in the uniform accelerated motion in the X-axis direction at the acceleration a≠0.

Next, FIG. 11 shows an example of an interpolation curve M(a≠0) representing the position of the object which travels in the uniform accelerated motion in the X-axis direction at the acceleration a≠0.

For example, the interpolation processing unit 43 stores a plurality of interpolation curves as shown in FIG. 11 in the built-in memory (not shown) and the like in association with different accelerations a.

Herein, in FIG. 11, the interpolation curve M drawn more on the right-hand side is correlated with a larger acceleration a, and the interpolation curve M drawn more on the left-hand side is correlated with a smaller acceleration a. Moreover, in FIG. 11, the interpolation curve M shows the position (x,y) of the object corresponding to the acceleration a for each of the different accelerations a.

Therefore, for example, the interpolation processing unit 43 determines the position of the object on the interpolation frames f1 to f4 by using an interpolation curve M(a>0) in the right direction in the figure as the calculated acceleration a becomes larger.

Moreover, for example, the interpolation processing unit 43 determines the position of the object on the interpolation frames f1 to f4 by using an interpolation curve M(a<0) in the left direction in the figure as the acceleration a becomes smaller.

As described with reference to FIG. 9 to FIG. 11, when the interpolation processing unit 43 determines the position of the object on the interpolation frames f1 to f4, the calculations using the expression (1) and the expression (2) and the like are unnecessary. Therefore, it is possible to determine the position of the object on the interpolation frames f1 to f4 in a shorter period of time.

Herein, the image processing apparatus 21 can be made to function as a television receiver, a hard disk recorder and the like.

Moreover, the present disclosure can also be configured as follows.

(1) An image processing apparatus, including: a motion vector detector configured to detect, based on a first image and a second image different from the first image among a plurality of images, motion vectors representing a movement of an object on the second image with respect to an object on the first image; a first calculation unit configured to calculate an acceleration of the object on the image based on the motion vectors; a second calculation unit configured to calculate an object position representing a position of an object on an interpolation image interpolated between the images adjacent in a time direction among the plurality of images based on the acceleration; and an interpolation processing unit configured to interpolate the interpolation image on which the object is drawn at the object position.

(2) The image processing apparatus according to Item (1), in which the second calculation unit calculates the object position based on an interpolation curve corresponding to the acceleration among a plurality of interpolation curves each representing the object position on the interpolation image.

(3) The image processing apparatus according to Item (1), in which the first calculation unit also calculates an initial velocity of the object on the image based on the motion vectors, and the second calculation unit calculates the object position on the interpolation image based on the acceleration and the initial velocity.

(4) The image processing apparatus according to Item (1), in which the first calculation unit calculates the acceleration of at least one of a horizontal direction and a vertical direction based on the motion vectors.

It should be noted that the series of processing described above may be performed by hardware or may be performed by software. When the series of processing is performed by software, programs constituting the software are installed from a program recording medium into a computer incorporated in dedicated hardware or into a general-purpose computer capable of installing various programs to execute various functions, for example.

[Configuration Example of the Computer]

Figure 12:
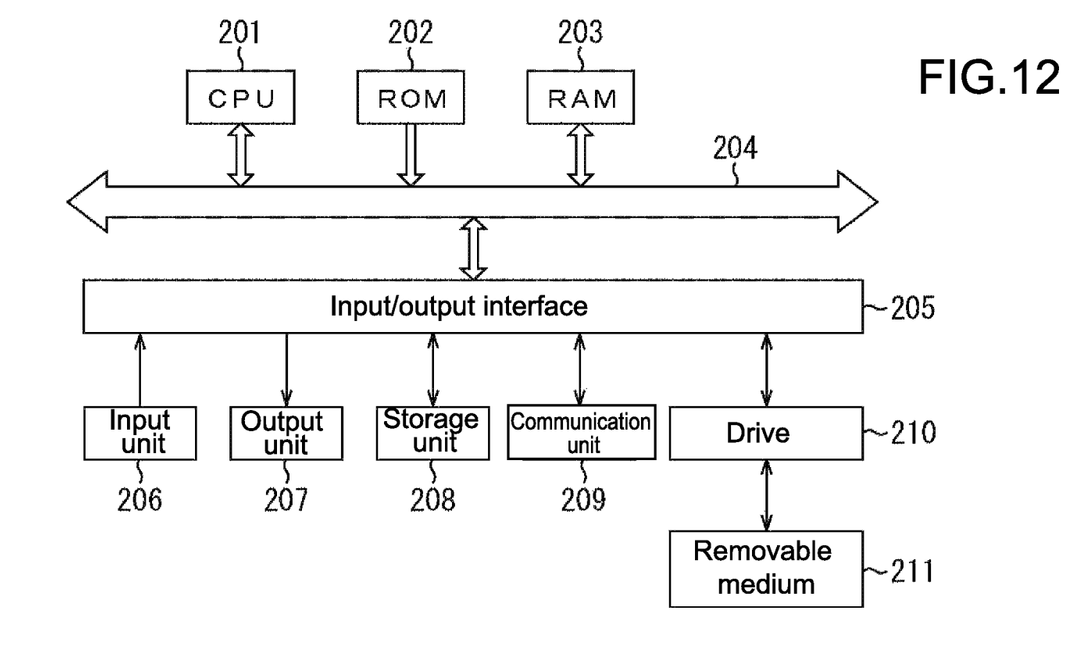
FIG. 12 is a diagram showing a configuration example of a computer.

FIG. 12 is a block diagram showing a typical configuration of the hardware of the computer for carrying out the series of processing described above with the programs.

A central processing unit (CPU) 201 executes various processing in accordance with a program stored in a Read Only Memory (ROM) 202 or a storage unit 208. A program to be executed by the CPU 201, data and the like are suitably stored into a Random Access Memory (RAM) 203. The CPU 201, the ROM 202 and the RAM 203 are connected to one another by a bus 204.

Also, an input/output interface 205 is connected to the CPU 201 through the bus 204. An input unit 206 including a keyboard, a mouse, a microphone and the like and an output unit 207 including a display unit, a speaker and the like are connected to the input/output interface 205. The CPU 201 executes various processing in accordance with an instruction inputted from the input unit 206. Then, the CPU 201 outputs a result of the processing to the output unit 207.

The storage unit 208 connected to the input/output interface 205 is constituted of, for example, a hard disk and stores a program to be executed by the CPU 201 and various data. A communication unit 209 communicates with an external apparatus connected thereto through a network such as the Internet and a local area network.

A program may be acquired through the communication unit 209 and stored into the storage unit 208.

A drive 210 is connected to the input/output interface 205. When a removable medium 211 such as a magnetic disk, an optical disc, a magneto-optical disc, and a semiconductor memory is loaded into the drive 210, the drive 210 drives the removable medium 211. Thereupon, the drive 210 acquires a program, data and the like recorded on the removable medium 211. The acquired program and data are transferred to and stored into the storage unit 208 as occasion demands.

The program recording medium on which a program to be installed into a computer and placed into an executable condition by the computer is recorded (stored) may be, for example, as shown in FIG. 12, a removable medium 211 in a form of a package medium constituted of a magnetic disk (including a flexible disk), an optical disc (including a CD-ROM (Compact Disc-Read Only Memory) and a DVD (Digital Versatile Disc)), a magneto-optical disc (including an MD (Mini-Disc)), or a semiconductor memory or may be constituted of the ROM 202, a hard disk included in the storage unit 208 or the like in which the program is stored temporarily or permanently. Recording of the program on the program recording medium is carried out, as occasion demands, through the communication unit 209 which is an interface such as a router and a modem, making use of a wired or wireless communication medium such as a local area network, the Internet and a digital satellite broadcast.

It should be noted that, in the present specification, the steps which describe the series of processing described above may be but need not necessarily be processed in a time series in the order described above, and include processing executed in parallel or individually without being processed in a time series.

Further, the present disclosure is not limited to the embodiments described hereinabove, and variable alterations and modifications can be made without departing from the spirit and scope of the present disclosure.

What is claimed is:

1. An image processing apparatus, comprising:
one or more processors operable to:
detect a plurality of motion vectors, wherein each of the plurality of motion vectors corresponds to a movement of an object in a respective consecutive pair of frames;
calculate an acceleration of the object based on the plurality of motion vectors;
calculate a position of the object based on an interpolation curve corresponding to the acceleration of the object, wherein the interpolation curve is one of a plurality of predetermined interpolation curves corresponding to different accelerations; and
interpolate an interpolation frame between one of the consecutive pair of frames, wherein the interpolation frame comprises the object displayed at the calculated position of the object.

2. The image processing apparatus according to claim 1, wherein the one or more processors are operable to calculate an initial velocity of the object based on the plurality of motion vectors, and calculate the position of the object on the interpolation frame based on the acceleration and the initial velocity.

3. The image processing apparatus according to claim 1, wherein the one or more processors are operable to calculate the acceleration in at least one of a horizontal direction and a vertical direction based on the plurality of motion vectors.

4. An image processing method comprising:
in an image processing apparatus:
detecting a plurality of motion vectors, wherein each of the plurality of motion vectors corresponds to a movement of an object in a respective consecutive pair of frames;
calculating an acceleration of the object based on the plurality of motion vectors;
calculating a position of the object based on an interpolation curve corresponding to the acceleration of the object, wherein the interpolation curve is one of a plurality of pre-determined interpolation curves corresponding to different accelerations; and
interpolating an interpolation frame between one of the consecutive pair of frames, wherein the interpolation frame comprises the object displayed at the calculated position of the object.

5. A non-transitory computer-readable storage medium having stored thereon, a computer program having at least one code section, the at least one code section being executable by one or more processors for causing a computer to perform steps comprising:
detecting a plurality of motion vectors, wherein each of the plurality of motion vectors corresponds to a movement of an object in a respective consecutive pair of frames;
calculating an acceleration of the object based on the plurality of motion vectors;
calculating a position of the object based on an interpolation curve corresponding to the acceleration of the object, wherein the interpolation curve is one of a plurality of predetermined interpolation curves corresponding to different accelerations; and
interpolating an interpolation frame between one of the consecutive pair of frames, wherein the interpolation frame comprises the object displayed at the calculated position of the object.

6. The image processing apparatus according to claim 1, wherein the one or more processors are operable to calculate a displacement of the object on the interpolation frame based on an initial velocity of the object and the acceleration of the object.

7. The image processing apparatus according to claim 6, wherein the displacement of the object is calculated in at least one of a horizontal direction and a vertical direction.

8. The image processing apparatus according to claim 7, wherein the one or more processors are operable to calculate the position of the object on the interpolation frame based on the displacement of the object and a reference position.

9. The image processing apparatus according to claim 1, wherein the one or more processors are operable to generate a moving image based on the interpolation of the interpolation frame.

10. The image processing apparatus according to claim 1, wherein the consecutive pair of frames differ from each other by a predetermined value.

11. The image processing apparatus according to claim 1, wherein each of the consecutive pair of frames comprises one common frame.

* * * * *